United States Patent
Judd et al.

(10) Patent No.: US 10,362,531 B2
(45) Date of Patent: Jul. 23, 2019

(54) SYSTEMS AND METHODS FOR ENHANCED SUBNETWORK PREFERENCE LOGIC

(71) Applicant: Honeywell International Inc., Morris Plains, NJ (US)

(72) Inventors: Thomas D. Judd, Woodinville, WA (US); Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/710,691

(22) Filed: Sep. 20, 2017

(65) Prior Publication Data

US 2019/0090180 A1 Mar. 21, 2019

(51) Int. Cl.
*H04B 7/00* (2006.01)
*H04W 48/18* (2009.01)
*H04W 64/00* (2009.01)

(52) U.S. Cl.
CPC ........... *H04W 48/18* (2013.01); *H04W 64/00* (2013.01)

(58) Field of Classification Search
CPC .............................. H04W 48/18; H04W 64/00
See application file for complete search history.

(56) References Cited

U.S. PATENT DOCUMENTS

| | | | |
|---|---|---|---|
| 7,027,812 B2 | 4/2006 | Dastrup et al. | |
| 7,729,263 B2 | 6/2010 | True et al. | |
| 8,121,140 B2 | 2/2012 | McGuffin et al. | |
| 9,420,595 B2 | 8/2016 | Beacham, Jr. et al. | |
| 2009/0041041 A1* | 2/2009 | True | H04B 7/18506 370/401 |
| 2011/0255506 A1* | 10/2011 | Toth | H04B 7/18506 370/331 |

OTHER PUBLICATIONS

U.S. Appl. No. 09/863,541, filed May 22, 2001; Published: US.
U.S. Appl. No. 11/835,864, filed Aug. 8, 2007; Published: US.
U.S. Appl. No. 12/018,654, filed Jan. 23, 2008; Published: US.

\* cited by examiner

*Primary Examiner* — Lakeram Jangbahadur
(74) *Attorney, Agent, or Firm* — Fogg & Powers LLC (57) ABSTRACT

Systems and methods for enhanced subnetwork preference logic are herein provided. In certain implementations, a method for transmitting messages over a datalink communication system includes identifying a location of a first communication unit; and identifying an altitude of the first communication unit. Further, the method includes selecting a sub-network preference for the first communication unit for communicating between the first communication unit and one or more other communication units, wherein the sub-network preference is selected based on the location and the altitude of the first communication unit, wherein the sub-network preference identifies one or more sub-networks in order of preference; and transmitting one or more messages to the one or more other communication units through a sub-network that is a most preferred sub-network as indicated by the selected sub-network preference and available for communications.

18 Claims, 5 Drawing Sheets

SYSTEMS AND METHODS FOR ENHANCED SUBNETWORK PREFERENCE LOGIC

BACKGROUND

Typically, communication management unit (CMU)/communication management function (CMF) datalink systems select an appropriate air-ground subnetwork to communicate downlink messages based on a configured air-ground subnetwork preference. The subnetwork preference may define subnetwork preferences in a particular geographic region and may be based on a message type basis in an AOC database. For example, the subnetwork preference may be implemented as a cost based routing preference logic associated with a region. In some regions, however, a different subnetwork preference may be desired when the vehicle is on the ground as compared to when the vehicle is in the air. Further, in certain regions, some networks may be available at lower altitudes that have different capabilities than the networks that are available at higher altitudes.

SUMMARY

Systems and methods for enhanced subnetwork preference logic are herein provided. In certain implementations, a method for transmitting messages over a datalink communication system includes identifying a location of a first communication unit; and identifying an altitude of the first communication unit. Further, the method includes selecting a sub-network preference for the first communication unit for communicating between the first communication unit and one or more other communication units, wherein the sub-network preference is selected based on the location and the altitude of the first communication unit, wherein the sub-network preference identifies one or more sub-networks in order of preference; and transmitting one or more messages to the one or more other communication units through a sub-network that is a most preferred sub-network as indicated by the selected sub-network preference and available for communications.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

System and methods for subnetwork preference logic are described herein. In embodiments described herein, subnetwork preferences may be defined based on three-dimensional geographic regions. For example, a plurality of wireless networks covering local, metropolitan and wide-area (collectively, of global or continental scales) may be selected based on a subnetwork preference associated with a particular three dimensional area to select an appropriate network for a datalink communication. Further, message routing and network selections defined in a subnetwork preference may also be based on the current state of the vehicle, where the current state may be the position and altitude of the vehicle. As discussed in further detail below, subnetwork preferences may be defined according to a particular area or customer preference. Further, the subnetwork preference may also be defined based on the three dimensional location within a particular area. For example, the vehicle may have different subnetwork preferences based on the altitude of a vehicle within a particular area. Another example, the vehicle may have different subnetwork preferences based on the time of day, day of the week of a vehicle, month, and/or year within a particular area.

Figure 1:
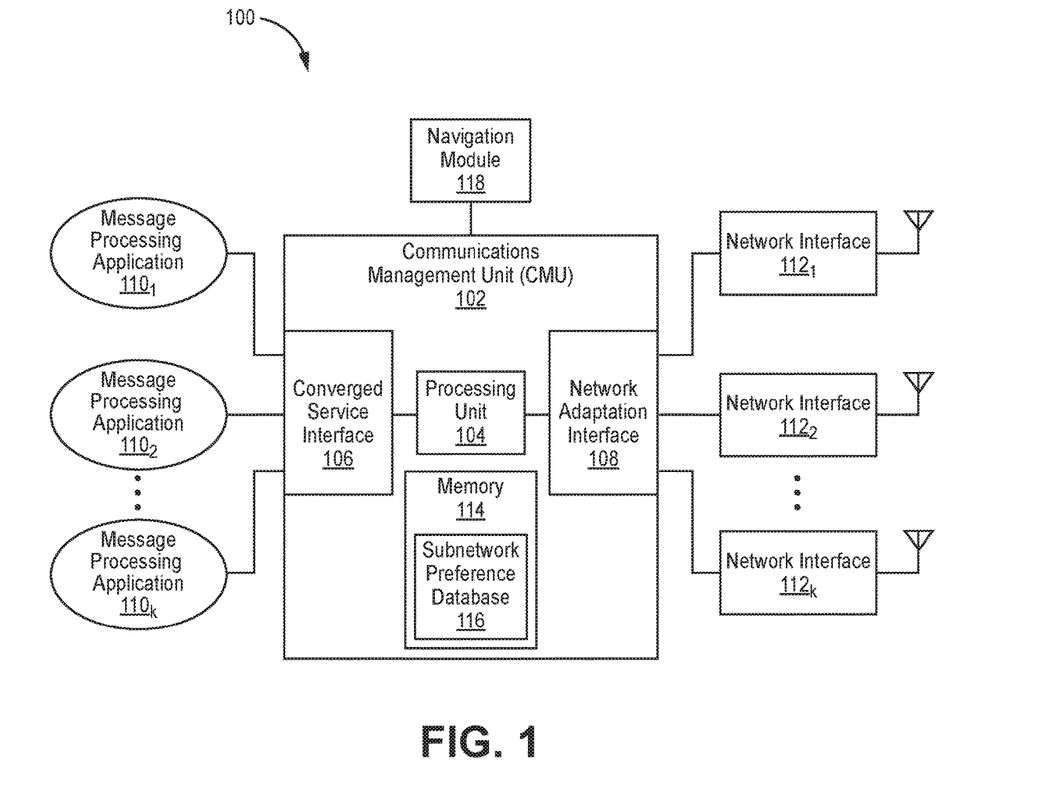
FIG. 1 is a block diagram of an avionics communications system.

FIG. 1 is a block diagram of an embodiment of a datalink communication system 100. In the example shown, the datalink communication system 100 may operate as an aircraft portion of an air to ground datalink communication system 100. In the example embodiment shown in FIG. 1, the datalink communication system 100 may include a CMU 102. The CMU 102 may further comprise a processing unit 104. In embodiments, described herein, the processing unit 104 may include at least one of a programmable microprocessor, a field-programmable gate array (FPGA), an application-specific integrated circuit (ASIC), and a programmable logic device (PLD). The processing unit 104 may execute code that directs the processing unit 104 to acquire data from a subnetwork preference database 116 stored in a memory 114. Further the system 100 may be able to accommodate any appropriate number of datalink applications and datalink terminals in the system 100. Further, the datalink communication system 100 includes a navigation module 118 for providing a position describing the location of the system in three dimensions. For example, when the communication system is on an aircraft, the navigation module 118 provides information describing the latitude, longitude, current time, date, and altitude of the aircraft. The navigation module 118 may include an IMU, a GPS receiver, an altimeter, a velocimeter, and any other devices known to one having skill in the art that may be useful for acquiring information related to the position of a vehicle.

In further implementations, the system 100 may include a converged service interface 106 and a network adaptation interface 108 that are communicatively coupled to the processing unit 104 within the CMU 102. The converged service interface 106 serves as an on-board routing function for data link messages to (from) the message processing applications 110. In one implementation, the converged service interface 106 transfers the data link messages between the appropriate message processing applications 110. Moreover, the converged service interface 106 translates between various data types of the message processing applications 110 for a plurality of routers to establish connectivity between the vehicle containing the system 100 and any requested endpoints. The network adaptation interface 108 provides network-specific adaptation functions to transmit specific application information over certain communications networks.

The system 100 further comprises message processing applications $110_1$ to $110_K$ communicatively coupled to the CMU 102. It is understood that the system 100 is capable of accommodating any appropriate number of message processing applications 110 (for example, at least one message processing application 110) in a single system 100. The message processing applications $110_1$ to $110_K$ include, but are not limited to, an FMS, aircraft traffic services, an aircraft condition monitoring system, maintenance computer, an EFB, and similar combinations of CMU-hosted message processing applications thereof. In addition, the system 100 comprises a plurality of network interfaces $112_1$ to $112_K$ communicatively coupled to the CMU 102. It is understood that the system 100 is capable of accommodating any appropriate number of network interfaces 112 (for example, at least one network interface 112) in a single system 100. 802.11n, 802.16d, 802.16e networking protocols.

The system 100 further comprises communication transceivers $112_1$ to $112_N$ coupled to the CMU 102. It is understood that the system 100 is capable of accommodating any appropriate number of communication transceivers 112 in a single system 100. The communication transceivers 112 may be operable for communication through a plurality of communication mediums. For example, the system 100 may be able to communicate through a very high frequency (VHF), high frequency (HF), Satellite Communications (SATCOM), and similar mobile air to ground or ground-based communication network and sub-network mediums. In at least one implementations, the mobile air-to-ground or ground-based communication network mediums may comprise at least one of a Gatelink network, a Wi-Fi network, a Worldwide Interoperability for Microwave Access (Wi-MAX) network, an AeroMACs network, one or more cellular communications networks, Broadband SATCOM, and the like.

In the example embodiment of FIG. 1, each message for transmission through one of the communications transceivers $112_1$ to $112_N$ is sent through a particular communication transceiver $112_1$ to $112_N$ according to a subnetwork preference as determined by the location of the system and the information stored in the subnetwork preference database 116 and based on available subnetwork. For example, the system may have an ordered list of subnetworks, where the subnetworks are ordered according to preference. Then the most preferred subnetwork of the available subnetworks can then be used for the message transmission. In certain implementations, when a message is available for transmission, the system 100 uses the location information to determine where the communication system 100 is located in three dimensions. If the system 100 is located above a certain altitude, the communication system 100 will transmit communications through one of the communication transceivers $112_1$ to $112_N$ based on a subnetwork preference stored in the subnetwork preference database 116 associated with the location and altitude of the communication system 100 and availability of the subnetwork. In at least one implementation, when the communication system 100 is on an aircraft, the processing unit 104 may receive the location information from the navigation module 118 to determine a flight phase for the aircraft. For example, the processing unit 104 may determine whether the aircraft is "in air", "on ground", or "low altitude." For example, the aircraft may be "in air" when the aircraft is flying above 10000 feet in elevation, the aircraft may be at "low altitude when the aircraft is flying below 10,000 feet, and "on ground" when the aircraft is not flying. In at least one location, the subnetwork preference, when "In Air", may indicate that SATCOM networks are preferred over VHF networks. In another location, the subnetwork preference, when "On ground", may indicate that a Wi-Fi network is preferred over other networks like ACARS.

As described above, the determinations of flight phase are described as primarily applying to altitude of the aircraft. In alternative implementations, other dimensions and factors could be used to augment the subnetwork preferences. For example, if a particular datalink charged more during peak hours versus off-hours, then other datalinks may be preferred in comparison to the particular datalink during those peak hours. Other factors that may affect the subnetwork preferences may include flight phase, size of message, heading of the vehicle (moving towards from more preferred subnetwork or moving away from the more preferred subnetwork). Based on these various factors described above, the communication system 100 may identify the subnetwork preference for a particular communication.

In at least one embodiment, the communication system 100 may allow a user to approve the subnetwork preference for a particular network. For example, in an aircraft, a crewmember may have the opportunity to override the logic that determined the subnetwork preference and then choose a subnetwork for communication based on the preference of and factors considered by the crewmember. When the communication system 100 accepts approval from a user, the communication system 100 may include a human machine interface 120 that displays information and accepts instructions from a user. In one implementation, the communication system 100 uses the same subnetwork preference for multiple messages over a period of time or within a certain area once chosen. Alternatively, the communication system 100 may identify the subnetwork preference for each message to be communicated through one of the subnetworks.

Figure 2:
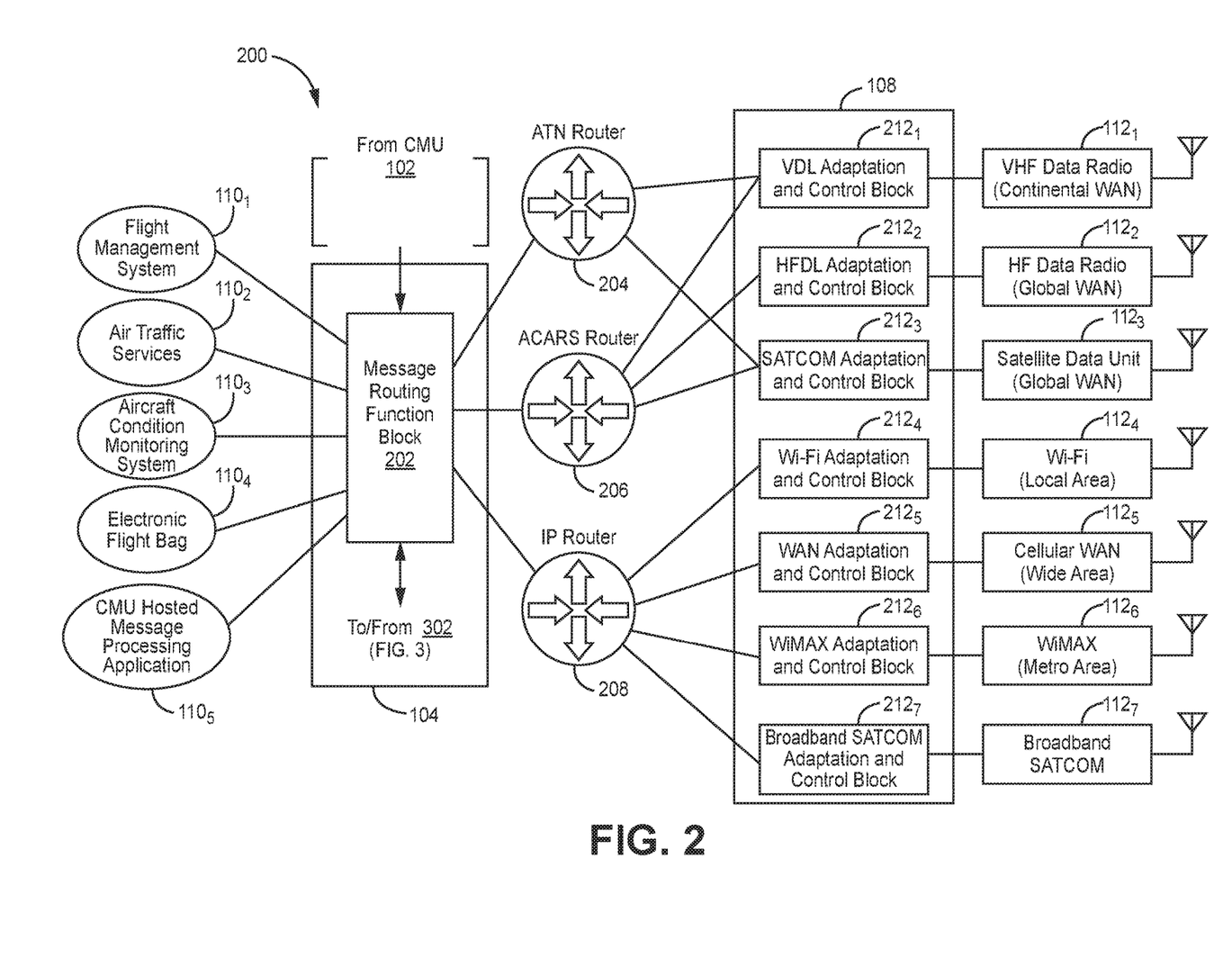
FIG. 2 is a block diagram of an embodiment of a message routing portion of an avionics communications system.

FIG. 2 is a block diagram of a message routing portion of an avionics communications system 200, similar to the system 100 of FIG. 1. The message routing portion of the system shown in FIG. 2 comprises the processing unit 104, the network adaptation interface 108, the message processing applications 110, and the network interfaces 112. The processing unit 104 further comprises a message routing function block 202 communicatively coupled to an ATN router 204, an ACARS router 206 and an Internet Protocol (IP) router 208. It is understood that additional routers for additional networking protocols are possible, and the network routing discussed here is not limited to any particular networking protocols. In at least one alternate implementation, the routers 204 to 208 form at least a portion of the processing unit 104.

In the example embodiment of FIG. 2, the message routing function block 202 is further responsive to the message processing applications $110_1$ to $110_5$. The message processing applications 110 comprise a flight management system $110_1$, aircraft traffic services $110_2$, an aircraft condition monitoring system $110_3$, maintenance computer, an electronic flight bag (EFB) $110_4$, cabin terminal, and CMU-hosted message processing applications $110_5$. As discussed above with respect to FIG. 1, alternate message processing applications 110 are possible. The message routing function block 202 is further operable to receive a subnetwork preference from the CMU 102. The received subnetwork preference directs the message routing function block 202 to select a particular network for communications from the CMU 102 described above in FIG. 1, where the particular network is an available network selected from a list of one or more preferred subnetwork. For example, the subnetwork preference may list that a VHF network is preferred over a SATCOM network but the VHF network isn't available. Thus the SATCOM is selected for the particular communications.

The routers 204 to 208 are further responsive to the network interfaces $112_1$ to $112_6$ through a plurality of adaptation and control blocks $212_1$ to $212_6$ of the network adaptation interface 108 as shown in FIG. 2. The network interfaces $112_1$ to $112_6$ comprise at least one of a VHF data link radio interface $112_1$, an HF data link radio interface $112_2$, a SATCOM data link radio interface $112_3$, a LAN interface $112_4$, a WAN interface $112_5$, BB (broadband) SATCOM, and a MAN interface $112_6$. The adaptation and control blocks $212_1$ to $212_6$ include a VHF data link (VDL) radio adaptation and control block $212_1$, an HF data link (HDL) radio adaptation and control block $212_2$, a SATCOM data link radio adaptation and control block $212_3$, a LAN adaptation and control block $212_4$, a WAN adaptation and control block $212_5$, BB SATCOM, and a MAN adaptation and control block $212_6$.

In operation, the messaging routing rules from the CMU 102 are analyzed by the message routing function block 202. As data link messages from the message processing applications 110 are received in the message routing function block 202, the message routing function block 202 determines which of the routers 204 to 208 will transfer the message over the applicable network interface 112. In the example embodiment of FIG. 2, the message routing rules from the CMU 102 are evaluated by the message routing function block 202 and each of the data link messages pass through the network adaptation interface 108 for any additional network selection adaptation functions that may be required to complete the data link transmission.

Figure 3:
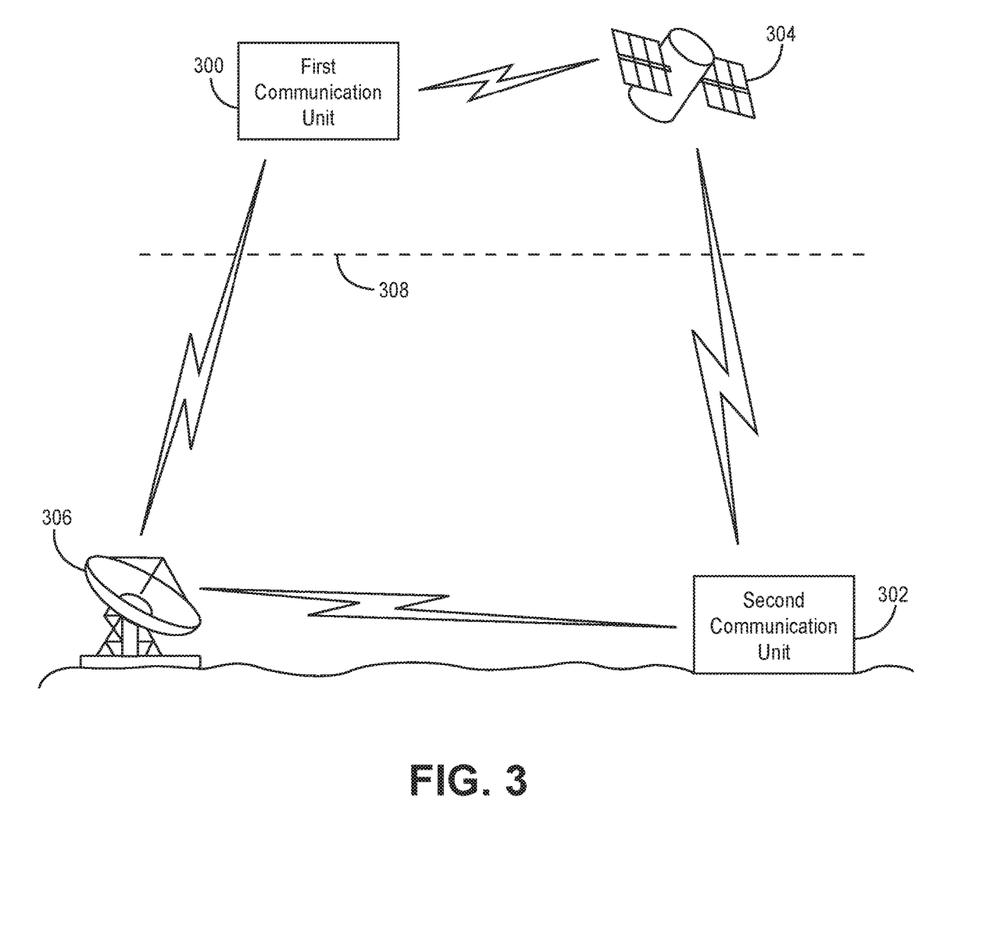
FIGS. 3 and 4 are diagrams of embodiments for selecting a subnetwork preference based on altitude of an avionics communications system.
Figure 4:
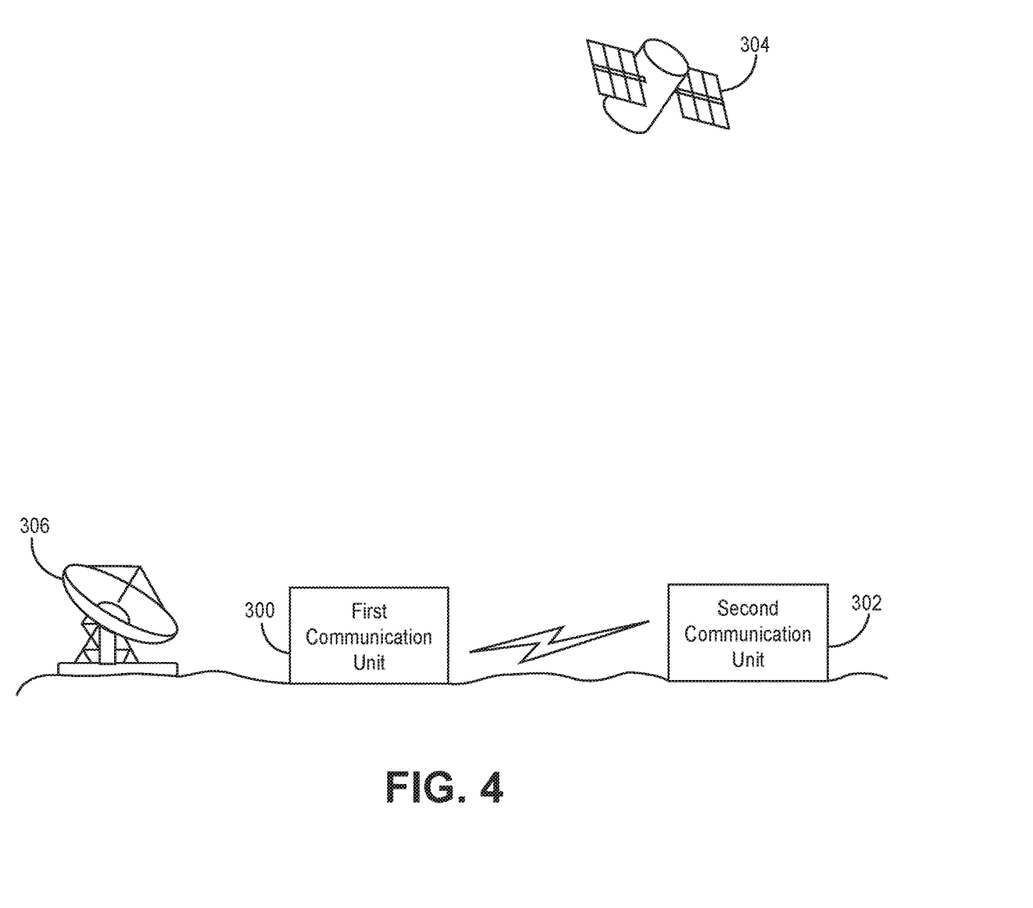

FIGS. 3 and 4 illustrate block diagram of a first communication unit that communicates with a second communication unit based on a subnetwork preference, where the first communication unit is located at different altitudes. For example, in FIG. 3, the first communication unit 300 may be located above a particular altitude 308. The communication system within the communication unit 300 may determine that the communication unit 300 is above the altitude 308. As the communication unit 300 is located above the altitude 308, the communication unit 300 uses a subnetwork preference associated with altitudes above the altitude 308. For example, the first communication unit 300 may potentially be in communication with a second communication unit 302 through a satellite communication link 304 and air-to-ground communication link 306. When, the first communication unit 300 is above the altitude 308, the first communication unit 300 may have a subnetwork preference that specifies that the satellite communication link 304 is preferred to the air-to-ground communication link 306.

In contrast to the example portrayed in FIG. 3, FIG. 4 portrays the first communication unit 300 as being located on the ground. When located at the ground, the first communication unit 300 (such as an aircraft that has landed or other vehicle) may be directed to have a different subnetwork preference than when the first communication unit 300 was in the air as described with relation to FIG. 3. For example, the first communication unit 300 may communicate with the second communication unit 202 through a Wi-Fi signal provided by the second communication unit. Further, while located on the ground, the first communication unit may still be able to be communicate through the communication links 306 and 304. In certain implementations, the first communication unit 300 may have a report to send that is substantially large, such that during certain flight phases, it would be difficult to transmit between the first communication unit 300 and the second communication unit 302. Accordingly, a subnetwork preference may indicate that messages that exceed a size threshold are not to be transmitted while in flight. However, when the first communication unit 300 lands, a different subnetwork preference may indicate that the large message is to be sent through a network such as a GATELINK, WiFi, or a cellular network.

Figure 5:
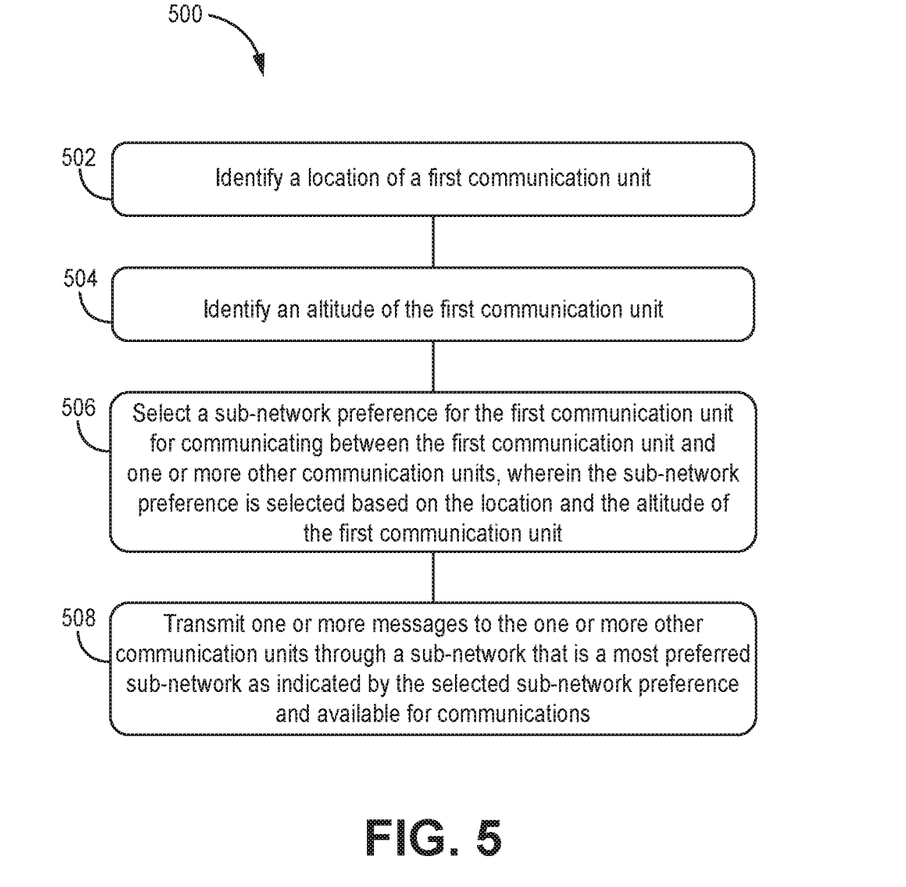
FIG. 5 is a flow diagram illustrating an embodiment of a method for selecting a subnetwork preference in an avionics communications system.

FIG. 5 illustrates a flow diagram of a method 500 for selecting a subnetwork preference. Method 500 proceeds at 502, where a location of a first communication unit is identified. Method 500 proceeds at 504, where an altitude of the first communication unit is identified. In certain examples, a navigation module, like an IMU or GPS receiver, provides measurements of location and altitude for the first communication unit. Further, method 500 proceeds at 506, where a sub-network preference is selected for the first communication unit for communicating between the first communication unit and one or more other communication units, wherein the sub-network preference is selected based on the location and the altitude of the first communication unit. For example, the first communication unit, when an aircraft may communicate with other communication units located on the ground through a datalink service provider as specified through the sub-network preference. Method 500 then proceeds at 508, where one or more messages are transmitted to one or more other communication units through a sub-network that is a most preferred sub-network as indicated by the selected sub-network preference and available for communications.

Example Embodiments

Example 1 includes a method for transmitting messages over a datalink communication system, the method comprising: identifying a location of a first communication unit; identifying an altitude of the first communication unit; selecting a sub-network preference for the first communication unit for communicating between the first communication unit and one or more other communication units, wherein the sub-network preference is selected based on the location and the altitude of the first communication unit, wherein the sub-network preference identifies one or more sub-networks in order of preference; and transmitting one or more messages to the one or more other communication units through a sub-network that is a most preferred sub-network as indicated by the selected sub-network preference and available for communications.

Example 2 includes the method of Example 1, wherein the sub-network preference is further selected based on a present time for the communication system.

Example 3 includes the method of any of Examples 1-2, wherein the identified altitude is the distance above ground level.

Example 4 includes the method of any of Examples 1-3, wherein the sub-network preference is further selected based on a flight phase of the aircraft.

Example 5 includes the method of any of Examples 1-4, wherein the sub-network preference is further selected based on the availability of broadband communications.

Example 6 includes the method of any of Examples 1-5, wherein the sub-network preference is further selected based on the heading of a vehicle containing the datalink communication system.

Example 7 includes the method of any of Examples 1-6, further comprising providing the selected sub-network preference to a user for approval of the sub-network preference.

Example 8 includes the method of any of Examples 1-7, further comprising applying the selected sub-network preference to a plurality of messages to be transmitted through the datalink communication system.

Example 9 includes the method of any of Examples 1-8, further comprising selecting the sub-network preference for each message to be transmitted through the datalink communication system.

Example 10 includes a communication system, comprising: a plurality of message processing applications configured to process messages received by the communication system; a plurality of network interfaces, communicatively coupled to the communication system, each of the network interfaces responsive to at least one wireless communications network; a location apparatus configured to identify the location of the communication system; a clock configured to provide the present time; and a processing unit and responsive to the plurality of message processing applications and the plurality of network interfaces the processing unit executing a sub-network identification function that identifies a sub-network preference based on the location and the time of the communication system, wherein the communication system communicates messages with other communication systems in accordance with the identified sub-network preference.

Example 11 includes the communication system of Example 10, further comprising a database configured to store sub-network preferences by region.

Example 12 includes the communication system of any of Examples 10-11, wherein the sub-network preference specifies limits for the size of transmissions.

Example 13 includes the communication system of any of Examples 10-12, wherein the identified altitude is the distance above ground level.

Example 14 includes the communication system of any of Examples 10-13, wherein the processing unit further selects the sub-network preference based on at least one of: a flight phase of the aircraft; availability of broadband communications; a heading of a vehicle containing the communication system.

Example 15 includes the communication system of any of Examples 10-14, further comprising a human machine interface configured to provide the selected sub-network preference to a user and accept an indication of approval by the user of the sub-network preference.

Example 16 includes a communication system, comprising: a plurality of message processing applications configured to process messages received by the communication system; a plurality of network interfaces, communicatively coupled to the communication system, each of the network interfaces responsive to at least one wireless communications network; a location apparatus configured to identify the location of the communication system; at least one of an altitude determining apparatus configured to identify the altitude of the communication system and/or a time determining apparatus configured to determine the present time; a memory configured to store a subnetwork preference database; and a processing unit and responsive to the plurality of message processing applications and the plurality of network interfaces the processing unit executing a sub-network identification function that identifies a sub-network preference based on the location and at least one of the altitude and/or the present time of the communication system, wherein the communication system communicates messages with other communication systems in accordance with the identified sub-network preference.

Example 17 includes the communication system of Example 16, wherein the processing unit selects the sub-network preference based on a present time for the communication system.

Example 18 includes the communication system of any of Examples 16-17, wherein the identified altitude is the distance above ground level.

Example 19 includes the communication system of any of Examples 16-18, wherein the processing unit further selects the sub-network preference based on at least one of: a flight phase of the aircraft; availability of broadband communications; a heading of a vehicle containing the communication system.

Example 20 includes the communication system of any of Examples 10-19, further comprising a human machine interface configured to provide the selected sub-network preference to a user and accept an indication of approval by the user of the sub-network preference.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for transmitting messages over a datalink communication system, the method comprising:
    identifying a location of a first communication unit, wherein the first communication unit is on a vehicle;
    identifying an altitude of the first communication unit;
    selecting a sub-network preference for the first communication unit for communicating between the first communication unit and one or more other communication units, wherein the sub-network preference is selected based on the location and the altitude of the first communication unit, or the present time, or both the altitude and the present time for the first communication unit, wherein the sub-network preference identifies two or more sub-networks in order of preference; and
    transmitting one or more messages to the one or more other communication units through a sub-network that is a most preferred sub-network as indicated by the selected sub-network preference and available for communications.

2. The method of claim 1, wherein the identified altitude is the distance above ground level.

3. The method of claim 1, wherein the vehicle is an aircraft, the sub-network preference is further selected based on a flight phase of the aircraft.

4. The method of claim 1, wherein the sub-network preference is further selected based on the availability of broadband communications.

5. The method of claim 1, wherein the sub-network preference is further selected based on a heading of the vehicle.

6. The method of claim 1, further comprising providing the selected sub-network preference to a user for approval of the sub-network preference.

7. The method of claim 1, further comprising applying the selected sub-network preference to a plurality of messages to be transmitted through the datalink communication system.

8. The method of claim 1, further comprising selecting the sub-network preference for each message to be transmitted through the datalink communication system.

9. A communication system, comprising:
a plurality of message processing applications configured to process messages received by the communication system, wherein the communication system is on a vehicle;
a plurality of network interfaces, communicatively coupled to the communication system, each of the network interfaces responsive to at least one wireless communications network;
a location apparatus configured to identify the location of the communication system; a clock configured to provide a present time; and
a processing unit and responsive to the plurality of message processing applications and the plurality of network interfaces the processing unit executing a sub-network identification function that identifies a sub-network preference based on the location and the present time of the communication system, wherein the communication system communicates messages with other communication systems in accordance with the identified sub-network preference.

10. The communication system of claim 9, further comprising a database configured to store sub-network preferences by region.

11. The communication system of claim 9, wherein the sub-network preference specifies limits for the size of transmissions.

12. The communication system of claim 9, wherein the identified altitude is the distance above ground level.

13. The communication system of claim 9, wherein the processing unit further selects the sub-network preference based on at least one of:
where the vehicle is an aircraft, a flight phase of the aircraft;
availability of broadband communications;
a heading of the vehicle.

14. The communication system of claim 9, further comprising a human machine interface configured to provide the selected sub-network preference to a user and accept an indication of approval by the user of the sub-network preference.

15. The communication system of claim 9, further comprising a human machine interface configured to provide the selected sub-network preference to a user and accept an indication of approval by the user of the sub-network preference.

16. A communication system, comprising:
a plurality of message processing applications configured to process messages received by the communication system, wherein the communication system is on a vehicle;
a plurality of network interfaces, communicatively coupled to the communication system, each of the network interfaces responsive to at least one wireless communications network;
a location apparatus configured to identify the location of the communication system; an
altitude determining apparatus configured to identify the altitude of the communication system, or a time determining apparatus configured to determine a present time, or both an altitude determining apparatus and a time determining apparatus;
a memory configured to store a subnetwork preference database; and
a processing unit and responsive to the plurality of message processing applications and the plurality of network interfaces the processing unit executing a sub-network identification function that identifies a sub-network preference based on the location of the communication system and based on of the altitude, or the present time, or both the altitude and the present time of the communication system, wherein the sub-network preference identifies two or more sub-networks in order of preference, wherein the communication system communicates messages with other communication systems in accordance with the identified sub-network preference.

17. The communication system of claim 16, wherein the identified altitude is the distance above ground level.

18. The communication system of claim 16, wherein the processing unit further selects the sub-network preference based on at least one of:
where the vehicle is an aircraft, a flight phase of the aircraft;
availability of broadband communications;
a heading of the vehicle.

* * * * *